United States Patent [19]

Abo

[11] Patent Number: 4,970,667
[45] Date of Patent: Nov. 13, 1990

[54] APPARATUS FOR DETECTING A CRANKSHAFT POSITION AT WHICH MAXIMUM CYLINDER PRESSURE APPEARS

[75] Inventor: Toshimi Abo, Kanagawa, Japan

[73] Assignee: Nissan Motor Company, Limited, Yokohama, Japan

[21] Appl. No.: 217,866

[22] Filed: Jul. 12, 1988

[30] Foreign Application Priority Data

Jul. 13, 1987 [JP] Japan ............... 62-108196[U]

[51] Int. Cl.⁵ .................. F02P 5/14; G01N 7/00
[52] U.S. Cl. .................. 364/558; 123/417; 123/425; 364/431.08
[58] Field of Search ............ 364/431.05, 431.08, 364/558; 123/417, 425, 426, 435; 73/115, 117.3

[56] References Cited

U.S. PATENT DOCUMENTS

| | | | |
|---|---|---|---|
| 4,131,097 | 12/1978 | Sawada et al. | 123/425 |
| 4,543,934 | 10/1985 | Morita et al. | 123/436 |
| 4,561,401 | 12/1985 | Hata et al. | 123/425 |
| 4,598,680 | 7/1986 | Lanfer | 123/425 |
| 4,718,382 | 1/1988 | Tanaka | 123/425 |
| 4,727,842 | 3/1988 | Takahashi | 123/425 |
| 4,739,649 | 4/1988 | Tanaka | 73/115 |
| 4,744,243 | 5/1988 | Tanaka | 73/115 |
| 4,748,952 | 6/1988 | Yagi et al. | 123/425 |
| 4,760,733 | 8/1988 | Tanaka | 73/115 |
| 4,774,922 | 10/1988 | Morita | 123/425 |
| 4,800,500 | 1/1989 | Tanaka | 364/431.08 |
| 4,802,454 | 2/1989 | Tanaka | 123/425 |
| 4,819,171 | 4/1989 | Morita | 123/425 |
| 4,821,194 | 4/1989 | Kawamura | 123/425 |
| 4,841,935 | 6/1989 | Yamada et al. | 123/435 |

FOREIGN PATENT DOCUMENTS

41-5154  3/1966  Japan.
49-17973  5/1974  Japan.
58-82074  5/1983  Japan.

Primary Examiner—Kevin J. Teska
Attorney, Agent, or Firm—Foley Lardner, Schwartz, Jeffery, Schwaab, Mack, Blumenthal & Evans

[57] ABSTRACT

An apparatus for detecting a crankshaft angular position $\theta_{pmax}$ at which the cylinder pressure reaches its maximum level. The apparatus samples a cylinder pressure indication signal at a predetermined target crankshaft angular position and at crankshaft angular positions advanced and retarded by a predetermined number of degrees of crankshaft rotation so as to accumulate three sets of data. The sampled three sets of data are used to determine a binominal equation defining the cylinder pressure as a function of crankshaft angular position. The apparatus calculates a maximum cylinder pressure value and a corresponding crankshaft angular position $\theta_{pmax}$ from the determined binominal equation.

4 Claims, 5 Drawing Sheets

APPARATUS FOR DETECTING A CRANKSHAFT POSITION AT WHICH MAXIMUM CYLINDER PRESSURE APPEARS

BACKGROUND OF THE INVENTION

This invention relates to an apparatus for detecting an engine crankshaft position $\theta_{pmax}$ at which the cylinder pressure reaches its maximum value.

In order to achieve high engine performance and high fuel economy, the ignition-system spark-timing is controlled in a manner to maintain the crankshaft angular position $\theta_{pmax}$ at a crankshaft angular position, for example, 15° after the top dead center of the piston, at which the engine produces a maximum torque. During requests for rapid engine warming, the ignition-system spark-timing may be controlled in a manner to maintain the crankshaft angular position $\theta_{pmax}$ at 25° after the top dead center of the piston.

For the purpose of these ignition-system spark-timing controls, it is the current practice to employ a digital computer which detects the maximum cylinder pressure by comparing a number of cylinder pressure values sampled from a cylinder pressure indication signal produced from a cylinder pressure sensor. Any attempts to increase the accuracy of detection of the engtine crankshaft position $\theta_{pmax}$ causes a corresponding increase in the frequecy of sampling operation of the cylinder pressure indication signal. This requires an expensive high-speed analog-to-digital converter, resulting in an expensive apparatus. In addition, the conventional apparatus is sensitive to noise which may be superimposed on the cylinder pressure indication signal, causing an error to be introduced in the sampled data used in detecting the maximum cylinder pressure.

SUMMARY OF THE INVENTION

It is a main object of the invention to provide a reliable and inexpensive apparatus for detecting an engine crankshaft position at which the cylinder pressure reaches its maximum value.

Another object of the invention is to provide such an apparatus as set forth above which is insensitive to noise which may be superimposed on a cylinder pressure indication signal produced from a cylinder pressure sensor.

There is provided, in accordance with the invention, an apparatus for use with an internal combustion engine having an crankshaft and at least one cylinder. The apparatus comprises sensor means sensitive to a pressure in the cylinder for providing a sensor signal indicative of a sensed cylinder pressure level, means for generating a series of crankshaft position electrical pulses each corresonding to a predetermined number of degrees of crankshaft rotation, and means responsive to the crankshaft position electrical pulses for sampling the sensor signal at a predetermined target crankshaft angular position $\theta 2$, at a crankshaft angular position $\theta 1$ advanced by a predetermined number of degrees of crankshaft rotation with respect to the target crankshaft angular position $\theta 2$, and at a crankshaft angular position $\theta 3$ retarded by the predetermined number of degrees of crankshaft rotation with respect to the target crankshaft angular position $\theta 2$ to accumulate three sets of data (P1, $\theta 1$), (P2, $\theta 2$) and (P3, $\theta 3$), where P1 is the cylinder pressure level sampled at the crankshaft angular position $\theta 1$, P2 is the cylinder pressure level sampled at the target crankshaft angular position $\theta 2$, and P3 is the cylinder pressure level sampled at the crankshaft angular position $\theta 3$. The apparatus also includes means for determining a binominal equation from the three sets of data (P1, $\theta 1$), (P2, $\theta 2$) and (P3, $\theta 3$), the binominal equation defining the cylinder pressure as a function of engine crankshaft angular position, means for calculating a maximum cylinder pressure value and a corresponding crankshaft angular position $\theta_{pmax}$ at which the maximum cylinder combustion pressure is calculated from the determined binominal equation; and means for outputting the calculated crankshaft angular position $\theta_{pmax}$.

BRIEF DESCRIPTION OF THE DRAWINGS

The invention will be described in greater detail by reference to the following description taken in connection with the accompanying drawings, in which like reference numerals identify like elements in the several figures and in which.

DETAILED DESCRIPTION OF THE INVENTION

Figure 1:
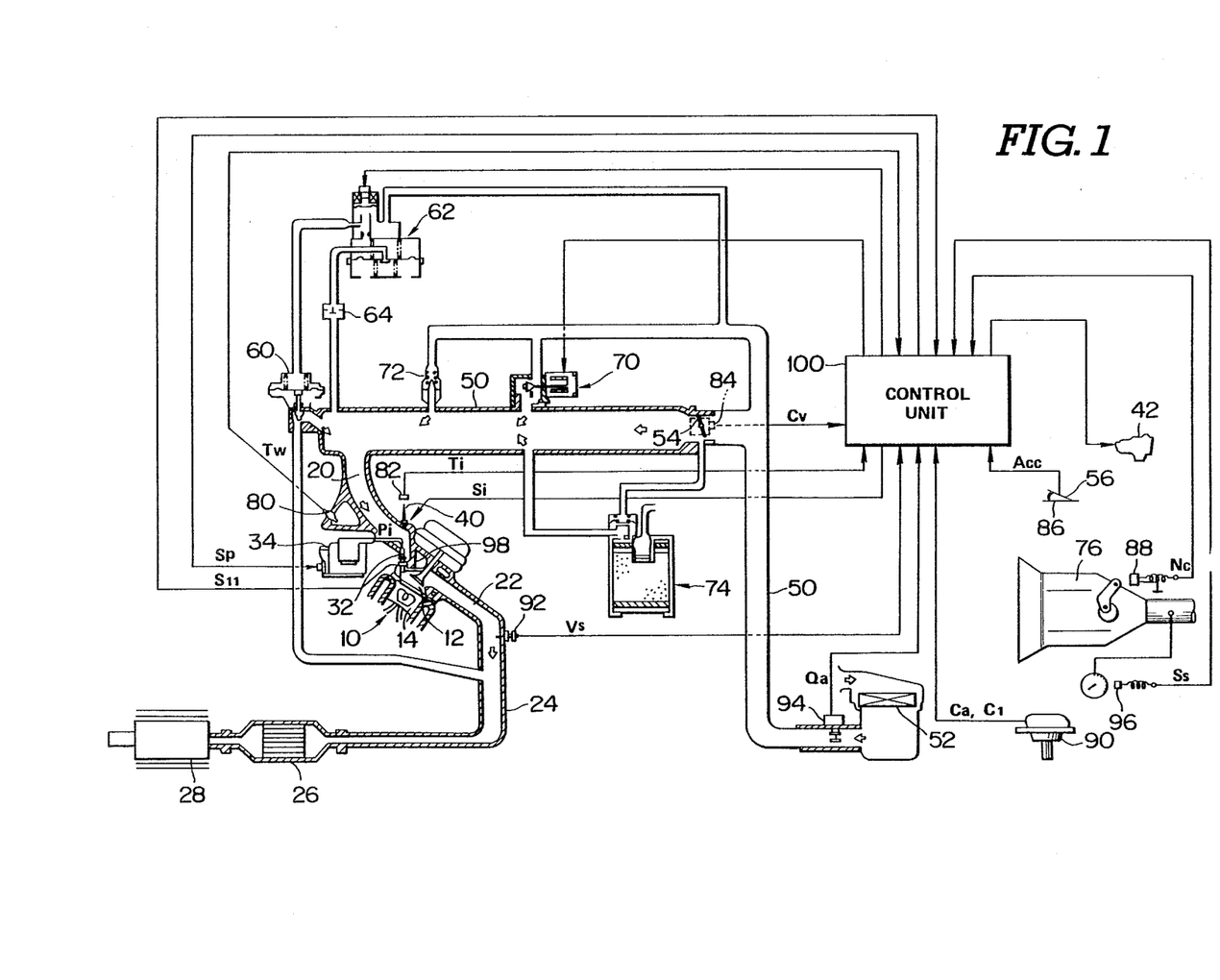
FIG. 1 is a schematic diagram of one embodiment of an apparatus made in accordance with the invention.

With reference to the drawings, wherein like numerals refer to like parts in the several views, and in particular to FIG. 1, there is shown a schematic diagram of an apparatus embodying the invention. An internal combustion engine, generally designated by the numeral 10, for an automotive vehicle includes a combustion chamber or cylinder 12. A piston 14 is mounted for reciprocal motion within the cylinder 12. A crankshaft (not shown) is supported for rotation within the engine 10 in response to reciprocation of the piston 14 within the cylinder 12.

An intake manifold 20 is connected with the cylinder 12 through an intake port with which an intake valve is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy Pi from an ignition coil 34. An exhaust manifold 22 is connected with the cylinder 12 through an exhaust port with which an exhaust valve is in cooperation for regulating the exit of combustion products, exhaust gases, from the cylinder 12 into the exhaust manifold 22. The intake and exhaust valves are driven through a suitable linkage with the crankshaft.

A fuel injector 40 is connected to a fuel pump 42 which is also connected to a fuel tank (not shown). The fuel pump 42 is electrically operated to maintain sufficient pressure. The fuel injector 40 opens to inject fuel into the intake manifold 20 when it is energized by the presence of electrical current Si. The length of the electrical pulse, that is, the pulse-width, applied to the fuel injector 40 determines the length of time the fuel injector opens and, thus, determines the amount of fuel injected into the intake manifold 20. Air to the engine 10 is supplied through an air cleaner 52 into an induction passage 50. The amount of air permitted to enter the combustion chamber through the intake manifold 20 is controlled by a butterfly throttle valve 54 located within the induction passage 50. The throttle valve 54 is connected by a mechanical linkage to an accelerator pedal 56. The degree to which the accelerator pedal 56 is depressed controls the degree of rotation of the throttle valve 54. The accelerator pedal 54 is manually controlled by the operator of the engine control system.

In the operation of the engine 10, fuel is injected through the fuel injector 40 into the intake manifold 20 and mixes with the air therein. The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 30 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22.

Although the engine 10 as illustrated in FIG. 1 shows only one combustion chamber 12 formed by a cylinder and piston, it should be understood that the engine control system described herein is designated for use on a four-cylinder engine. Thus, it should be understood that there are at a total of four cylinders, intake valves, exhaust valves and reciprocating pistons, and four spark plugs to ignite the air-fuel mixture within the combustion chambers.

Figure 2:
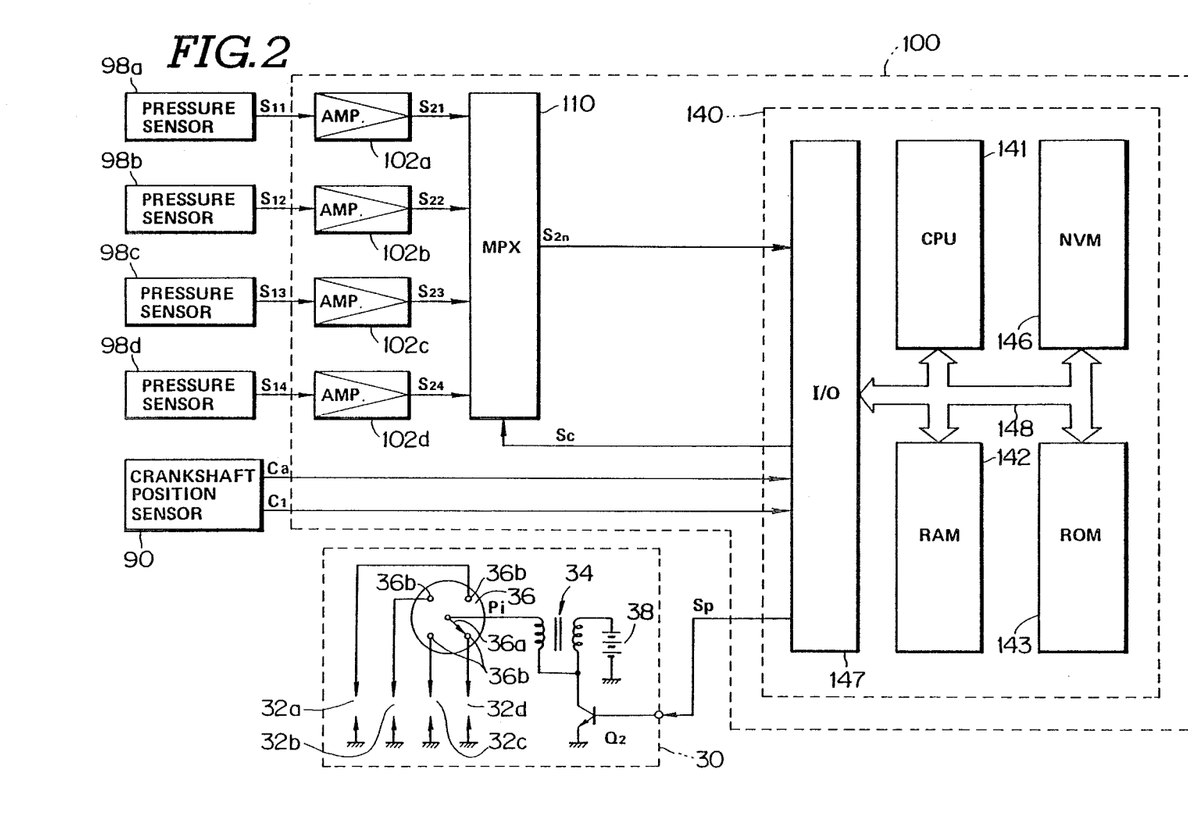
FIG. 2 is a block diagram showing the control unit which may be used in the apparatus of the invention.

Referring to FIG. 2, the ignition system, generally designated by the numeral 30, includes a distributor 36 connected with the ignition coil 34 to energize the four spark plugs 32 of the engine. For this purpose, the ignition coil 34 has a primary winding connected across a battery 38 through a transistor Q2. The ignition coil 34 has a high voltage terminal connected to a rotor 36a of the distributor 36. The rotor 36a is driven at one-half the rotational velocity of the crankshaft. The distributor 36 has four electrical contacts 36b each of which is connected in the usual manner by separate electrical leads to the four spark plugs 32 of the engine. As the distributor rotor 36a rotates, it sequentially contacts the electrical contacts 36b to permit high voltage electrical energy to be supplied at appropriate intervals to the spark plugs 32, causing sparks to be generated across the gaps 32a, 32b, 32c and 32d of the respective spark plug 32. The distributor 36 does not control ignition-system spark-timing. Rather, spark-timing is an independently controlled variable calculated through the use of a digital computer in a manner hereinafter described.

It is to be understood that the illustrated four cylinder internal combustion engine 10 is shown and described only to facilitate a more complete understanding of the apparatus of the invention.

The amount of fuel metered to the engine, this being determined by the width of the electrical pulses applied to the fuel injector 40, the fuel-injection timing, the EGR valve position, and the ignition-system spark timing are repetitively determined from calculations performed by a digital computer, these calculations being based upon various conditions of the engine that are sensed during its operation. These sensed conditions include cylinder-head coolant temperature Tw, fuel temperature Tf, throttle position Cv, accelerator pedal position Acc, transmission gear position Nc, crankshaft position Ss, exhaust oxygen content Vs, intake air flow Qa, engine speed N, and cylinder combustion pressure. Thus, a cylinder-head coolant temperature sensor 80, a fuel temperature sensor 82, a throttle position sensor 84, an accelerator-pedal position sensor 86, a transmission-gear position sensor 88, a crankshaft position sensor 90, an oxygen sensor 92, a flow meter 94, an engine speed sensor 96, and pressure sensors 98 are connected to a control unit 100.

The cylinder-head coolant temperature sensor 80 preferably is mounted in the engine cooling system and comprises a thermistor connected in an electrical circuit capable of producing a DC voltage having a variable level proportional to coolant temperature. The fuel temperature sensor 82 preferably is a thermistor device connected in an electrical circuit capable of producing a DC voltage having a variable level proportional to fuel temperature. The throttle-valve and accelerator-pedal position sensors 84 and 86 are potentiometers electrically connected in voltage divider circuits for supplying DC voltages proportional, respectively, to throttle-valve position and accelerator-pedal position. The transmission-gear position sensor 88 is responsive to the position of the transmission gear in neutral for generating a voltage signal. The crankshaft position sensor 90 produces a series of crankshaft position electrical pulses C1 each corresponding to one degree of rotation of the engine crankshaft and a series of reference electrical pulses Ca at a predetermined number of degrees before the top dead center position of each engine piston. The oxygen sensor 92 monitors the oxygen content of the exhaust and is effective to provide a signal indicative of the air-fuel ratio at which the engine is operating. The flow meter 94 is responsive to the air flow through the induction passage 50 to produce a signal proportional thereto. The engine speed sensor 96 produces a signal corresponding to the speed of running of the engine. Each of the pressure sensor 98 comprises a force ring of the piezoelectric type. The force ring, which may be firmly secured to the engine by a spark plug or a cylinder head bolt tightened to rated torque, serves as a cylinder pressure signal source. The force ring generates a charge signal corresponding to the pressure exerted on the force ring. One example of a cylinder pressure signal source suitable for use with this invention is set forth in schematic form in FIGS. 3A-3C.

Figure 3:
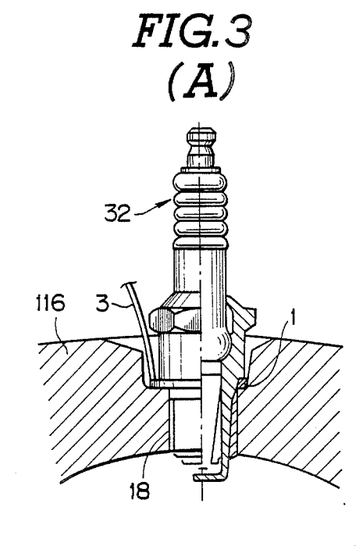
FIGS. 3A-3C comprise three figures showing a cylinder pressure sensor suitable for use in the apparatus.

Referring to FIGS. 3A-3C, which show, the force ring, generally designated by the numeral 1, circumscribes a spark plug 32 which has a threaded portion engaged with the inward thread 18 of the cylinder head 16 of an engine cylinder 12 in a manner to tighten the force ring 1 against the cylinder head 16. The force ring 1 comprises a center ring electrode 2 connected to an output electrode 3. The center electrode 2 is sandwiched between a pair of piezoelectric ring elements 4. The upper piezoelectric element has an upper ring electrode 6 disposed thereon. The lower piezoelectric element has a lower ring electrode 7 disposed thereon. An insulating member 8 is provided, such as by molding, to insulate the force ring 1 from the spark plug 2 and the cylinder head 16. During the opertion of the engine, the spark plug 32 moves and vibrates due to cylinder pressure variations and engine vibrations transmitted thereto, varying the pressure exerted on the force ring 1. The force ring 1 generates a charge signal through the output electrode 3, the charge signal varying with variations in the pressure exerted on the force ring 1. Such a pressure sensor is disclosed, for example, in Japanese Patent Publication No. 41-5154.

Returning to FIG. 2, the control unit 100 includes four charge amplifiers 102a, 102b, 102c and 102d each of which may be taken in the form of a charge-to-voltage converter. The charge amplifiers receive charge signals S11, S12, S13 and S14 from the respective pressure sensors 98a, 98b, 98c and 98d and convert the charge signals into voltage signals corresponding to the pressures produced in the respective cylinders 12. These voltage signals are applied to an analog multiplexer 110 which transfers the input signals, one by one, at appropriate intervals to produce an output signal. The control unit 100 also includes a digital computer 140 which includes a central processing unit (CPU) 141, a random access memory (RAM) 142, a read only memory (ROM) 143, a nonvolatile memory (NVM) 146, and an input/output control circuit 147. The central processing unit 141 communicates with the rest of the computer via data bus 148. The input/output control circuit 147 includes an analog-to-digital converter, a crankshaft position counter, and a spark timing control circuit. The analog-to-digital converter receives analog signals from the various sensors 80 to 98 and it converts the received signal into corresponding digital signals for application to the central processing unit 141. The A to D coversion process is initiated on command from the central processing unit 141 which selects the input channel to be converted. The crankshaft position counter counts the crankshaft position pulses C1. The read only memory 143 contains the program for operating the central processing unit 141 and further contains appropriate data in look-up tables used in calculating appropriate values for ignition-system spark timing. The look-up data may be obtained experimentally or derived empirically. The central processing unit 141 may be programmed in a known manner to interpolate between the data at different entry points if desired. Control words specifying a desired spark timing are periodically transferred by the central processing unit 141 to the spark timing control circuit which converts it into a control signal Sp to the transistor Q2 for controlling the spark timing of the ignition system 30. The digital computer is responsive to an interrupt signal to temporarily stop execution of the program control sequence (background job) and to start executing an interrupt routine for controlling the parameters during a specified operating condition.

The digital computer central processing unit 141 is coupled to the crankshaft position electrical pulses for sampling the cylinder pressure indication signal at a predetermined target crankshaft angular position $\theta 2$ and at crankshaft angular positions $\theta 1$ and $\theta 3$ advanced and retarded by a predetermined number of degrees of crankshaft rotation with respect to the target crankshaft angular position $\theta 2$ to accumulate three sets of data (P1, $\theta 1$), (P2, $\theta 2$) and (P3, $\theta 3$). The character P1 designates the cylinder pressure level sampled at the crankshaft angular position $\theta 1$, the character P2 is the cylinder pressure level sampled at the target crankshaft angular position $\theta 2$, and the character P3 is the cylinder pressure level sampled at the crankshaft angular position $\theta 3$. The central processing unit 141 employs the three sets of data (P1, $\theta 1$), (P2, $\theta 2$) and (P3, $\theta 3$) to determine a binominal equation which defines the cylinder pressure P as a function of engine crankshaft angular position $\theta$. The central processing unit 141 also makes calculations, from the determined binominal equation, of a maximum cylinder pressure value and a corresponding crankshaft angular position $\theta_{pmax}$ at which the cylinder pressure is at maximum. The central processing unit 141 employs the calculated crankshaft angular position $\theta_{pmax}$ to calculate an optimum value for ignition-system spark-timing in such a manner as to coincide the calculated crankshaft angular position $\theta_{pmax}$ with the target position $\theta 2$. The calculated optimum value is transferred to the ignition-system spark-timing control circuit included in the input/output unit 147. The ignition-system spark-timing control circuit sets the spark-timing by producing pulses Sp to the transistor Q2 to cause an ignition spark to be produced at the time calculated by the computer.

Figure 4:
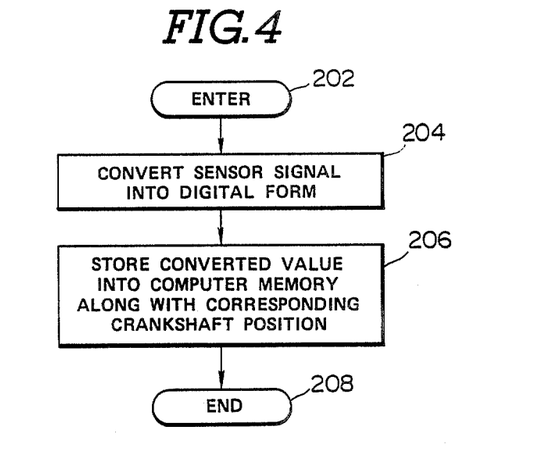
FIG. 4 is a flow diagram illustrating the programming of the digital computer as it is used to sample the sensor signal fed from the cylinder pressure sensor.

FIG. 4 is a flow diagram illustrating the programming of the digital computer 140 as it is used to sample the sensor signal fed from the cylinder pressure sensor so as to accumulate three sets of cylinder pressure values and the corresponding crankshaft angular position values. The computer program is entered at the point 202 when the engine crankshaft reaches a predetermined angular position $\theta 1$, $\theta 2$ or $\theta 3$. The position $\theta 2$ is a target crankshaft angular position (for example, 16° after the top dead center of the piston of the cylinder) at which the engine produces a maximum torque. The position $\theta 1$ is a crankshaft angular position (for example, 8° after the top dead center of the piston) advanced by a predetermined number of degrees $\theta o$ (in this case 8°) with respect to the target crankshaft angular position $\theta 2$. The position $\theta 3$ is a crankshaft angular position (for example, 24° after the top dead center of the piston) retarded by the predetermined number of degrees $\theta o$ with respect to the target crankshaft position $\theta 2$.

The computer program is entered at the point 202 when the engine crankshaft reaches the angular position $\theta 1$. At the point 204 in the program, the digital computer central processing unit 141 actuates the analog-to-digital converter to convert the existing cylinder pressure value into a corresponding digital value P1. At the point 206 in the program, the converted digital value P1 is stored along with the crankshaft angular position $\theta 1$. Following this, the program proceeds to the end point 208.

The computer program is entered at the point 202 when the engine crankshaft reaches the angular position $\theta 2$. At the point 204 in the program, the digital computer central processing unit 141 actuates the analog-to-digital converter to convert the existing cylinder pressure value into a corresponding digital value P2. At the point 206 in the program, the converted digital value P2 is stored along with the crankshaft angular position $\theta 2$. Following this, the program proceeds to the end point 208. Similarly, the computer program is entered at the point 202 when the engine crankshaft reaches the angular position $\theta 3$. At the point 204 in the program, the digital computer central processing unit 141 actuates the analog-to-digital converter to convert the existing cylinder pressure value into a corresponding digital value P2. At the point 206 in the program, the converted digital value P3 is stored along with the crankshaft angular position θ3. Following this, the program proceeds to the end point 208. As a result, the computer memory stores three sets of data (P1, θ1), (P2, θ2) and (P3, θ3) which correspond to the coordinates of the points S1, S2 and S3 of FIG. 6, respectively.

Figure 5:
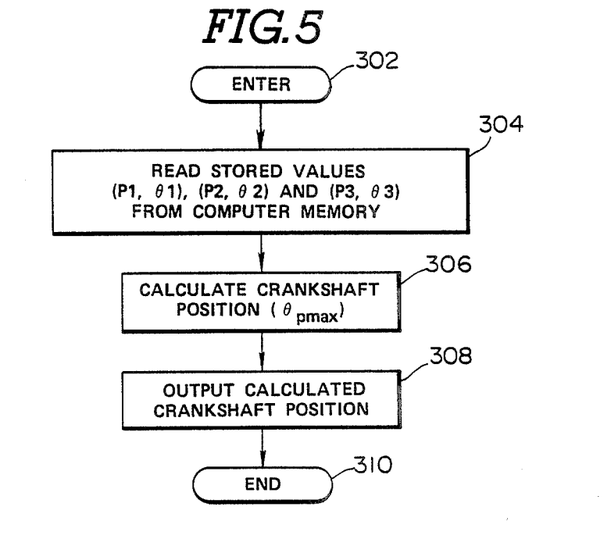
FIG. 5 is a flow diagram illustrating the programming of the digital computer as it is used to calculate the crankshaft angular position $\theta_{pmax}$ at which the cylinder pressure is at maximum.

FIG. 5 is a flow diagram illustrating the programming of the digital computer 140 as it is used to calculate the crankshaft angular position $\theta_{pmax}$ at which the cylinder pressure reaches its maximum value. The computer program is entered at the point 302 when the engine crankshaft reaches a predetermined angular position θ4 (for example, 40° after the top dead center of the piston) retarded by a predetermined number of degrees with respect to the crankshaft angular position θ3; that is, after completion of the data sampling operation performed during the execution of the program of FIG. 4. At the point 304 in the program, the data (P1, θ1), (P2, θ2) and (P3, θ3) accumulated during the execution of the program of FIG. 4 are read from the computer program. At the point 306 in the program, the central processing unit employs the read data to calculate a crankshaft angular position value $\theta_{pmax}$ at which the cylinder pressure reaches its maximum value. This calculation is made as follows:

The central processing unit obtains a binomial equation $P = \alpha\theta^2 + \beta\theta + r$ which defines the cylinder pressure P as a function of engine crankshaft angular position. The coefficients $\alpha$, $\beta$ and r are determined by solving the following simultaneous equations:

$$P1 = \alpha\theta 1^2 + \beta\theta 1 + r$$

$$P2 = \alpha\theta 2^2 + \beta\theta 2 + r$$

$$P3 = \alpha\theta 3^2 + \beta\theta 3 + r$$

Figure 6:
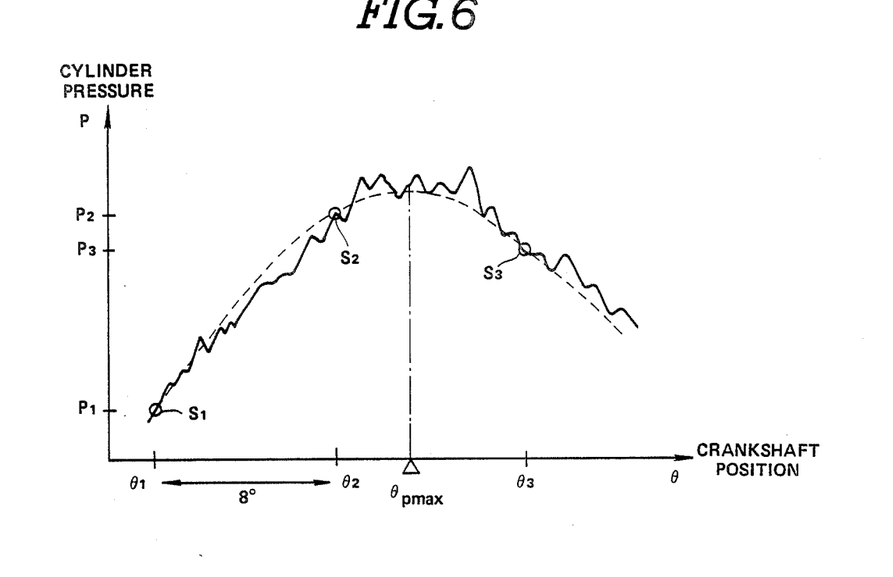
FIG. 6 is a graph used in explaining the operation of the apparatus of the invention.

It is to be noted that the binomial equation $P = \alpha\theta^2 + \beta\theta + r$ represents a curve of second degree, as indicated by the broken curve of FIG. 6, which extends through the points S1(P1, θ1), S2(P2, θ2) and S3(P3, θ3). The central processing unit differentiates the both sides of the binomial equaltion $P = \alpha\theta^2 + \beta\theta + r$ as $dP/d\theta = 2\alpha\theta + \beta$. The cylinder pressure P represented by the binomial equation has its maximum value when $dP/d\theta = 2\alpha\theta + \beta = 0$. Thus, the crankshaft angular position $0_{pmax}$ is calculated as $\theta_{pmax} = -\beta/2\alpha$. Substituting the determined coefficients $\alpha$ and $\beta$ into this equation, the crankshaft angular position $\theta_{pmax}$ (or D) is solved as:

$$D = \theta 2 + \{(\theta 2 - \theta 1)/2\} \times \{(P3 - P2)/(2P2 - P1 - P3)\}$$

Since $\theta 2 - \theta 1 = 8°$ C. and $\theta 2 = 16°$ C. in this case, D is represented as:

$$D = \theta 2 + 4 \times (P3 - P2)/(2P2 - P1 - P3)$$

At the point 308 in the program, the calculated crankshaft angular position value $\theta_{pmax}$ is outputted for use in calculating an optimum value for ignition-system spark-timing in such a manner as to coincide the calculated crankshaft angular position $\theta_{pmax}$ with the target position θ2 at which the engine produces a maximum torque. Such an MBT control is well known in the art and is disclosed, for example, in Japanese Patent Kokai No. 58-82074. Following this, the program proceeds to the end point 310.

Although the invention has been described in connection with an MBT control, it is to be noted that the calculated crankshaft angular position $\theta_{pmax}$ may be used to control the ignition-system spark timing in such a manner as to coincide the calculated crankshaft angular position $\theta_{pmax}$ with 25° after the top dead center of the piston during requests for rapid engine warming. In this case, the cylinder pressure indication signal may be sampled at 17° after the top dead center of the piston, 25° after the top dead center of the piston, and 33° after the top dead center of the piston to accumulate three sets of data (P1, θ1), (P2, θ2) and (P3, θ3). It is to be noted, of course, that the sampling interval is not limited to 8° of crankshaft rotation.

The apparatus of the invention detects the crankshaft angular position $\theta_{pmax}$ at which the cylinder pressure is at maximum by using a binominal equation defining the cylinder pressure as a function of crankshaft angular position. Since the binominal equation is obtained from only three sets of data in each cycle of operation of the engine, the apparatus is simple, reliable, inexpensive, and insensitive to noise which may be superimposed on the cylinder pressure indication signal.

What is claimed is:

1. An apparatus for use with an internal combustion engine having an engine crankshaft and at least one cylinder, the apparatus comprising:
   sensor means sensitive to a pressure in the cylinder for providing a sensor signal indicative of a sensed cylinder pressure level;
   means for generating a series of crankshaft position electrical pulses, wherein each of the crankshaft position electrical pulses correspond to a predetermined number of degrees of crankshaft rotation;
   means responsive to the crankshaft position electrical pulses for sampling the sensor signal at a predetermined target crankshaft angular position θ2, at a crankshaft angular position θ1 advanced by a predetermined number of degrees of crankshaft rotation with respect to the target crankshaft angular position θ2, and at a crankshaft angular position θ3 retarded by the predetermined number of degrees of crankshaft rotation with respect to the target crankshaft angular position θ2, to accumulate three sets of data (P1, θ1), (P2, θ2) and (P3, θ3), where P1 is the cylinder pressure level sampled at the crankshaft angular position θ1, P2 is the cylinder pressure level sampled at the target crankshaft angular position θ2, and P3 is the cylinder pressure level sampled at the crankshaft angular position θ3;
   means for determining a second order binominal equation from the three sets of data (P1, θ1), (P2, θ2) and (P3, θ3), wherein the binominal equation defines the cylinder pressure as a function of crankshaft angular position;
   means for calculating a maximum cylinder pressure value and a corresponding crankshaft angular position $\theta_{pmax}$ at which the maximum cylinder pressure value is calculated from the determined binominal equation; and
   means for outputting the calculated crankshaft angular position $\theta_{pmax}$.

2. The apparatus as claimed in claim 1, which further comprises means responsive to the calculated crankshaft angular position $\theta_{pmax}$ for controlling an ignition-system spark-timing to maintain the calculated crankshaft angular position $\theta_{pmax}$ at the target crankshaft angular position θ2.

3. A method for determining a crankshaft angular position $\theta_{pmax}$ at which a maximum cylinder pressure value is obtained in a given engine crankshaft rotation cycle, said method comprising the steps of:
- (A) sensing pressure in the cylinder and generating a sensor signal indicative of the sensed cylinder pressure level;
- (B) generating a series of crankshaft position electrical pulses, wherein each of the crankshaft position electrical pulses correspond to a predetermined number of degrees of crankshaft rotation;
- (C) sampling the sensor signal at a predetermined target crankshaft angular position $\theta 2$, at a crankshaft angular position $\theta 1$ advanced by a predetermined number of degrees of crankshaft rotation with respect to the target crankshaft angular position $\theta 2$, and at a crankshaft angular position $\theta 3$ retarded by the predetermined number of degrees of crankshaft rotation with respect to the target angular crankshaft position $\theta 2$, to accumulate three sets of data, wherein each respective set of data comprises (i) a cylinder pressure level sampled at a corresponding crankshaft angular position and (ii) the corresponding crankshaft angular position;
- (D) determining a second order binomial equation from the three sets of data, wherein the binomial equation defines the cylinder pressure as a function of crankshaft angular position;
- (E) calculating the crankshaft angular position $\theta_{pmax}$ at which the maximum cylinder pressure value is obtained from the determined binomial equation; and
- (F) outputting the calculated crankshaft angular position $\theta_{pmax}$.

4. A method for controlling an ignition-system spark-timing of an engine having an engine crankshaft and at least one cylinder, the method comprising:

- (A) sensing pressure in the cylinder and generating a sensor signal indicative of the sensed cylinder pressure level;
- (B) generating a series of crankshaft position electrical pulses, wherein each of the crankshaft position electrical pulses correspond to a predetermined number of degrees of crankshaft rotation;
- (C) sampling the sensor signal at a predetermined target crankshaft angular position $\theta 2$, at a crankshaft angular position r1 advanced by a predetermined number of degrees of crankshaft rotation with respect to the target crankshaft angular position $\theta 2$, and at a crankshaft angular position $\theta 3$ retarded by the predetermined number of degrees of crankshaft rotation with respect to the target angular crankshaft position $\theta 2$, to accumulate three sets of data, wherein each respective set of data comprises (i) a cylinder pressure level sampled at a corresponding crankshaft angular position and (ii) the corresponding crankshaft angular position;
- (D) determining a second order binomial equation from the three sets of data, wherein the binomial equation defines the cylinder pressure as a function of crankshaft angular position;
- (E) calculating the crankshaft angular position $\theta_{max}$ at which the maximum cylinder pressure value is obtained from the determined binomial equation;
- (F) emitting a signal indicative of the calculated crankshaft angular position $\theta_{pmax}$; and
- (G) controlling the ignition-system spark-timing in accordance with the signal emitted in the step (F) to maintain the calculated crankshaft angular position $\theta_{pmax}$ at the target crankshaft angular position $\theta 2$.

* * * * *